US006598131B2

(12) United States Patent
Kedem et al.

(10) Patent No.: US 6,598,131 B2
(45) Date of Patent: Jul. 22, 2003

(54) DATA IMAGE MANAGEMENT VIA EMULATION OF NON-VOLATILE STORAGE DEVICE

(75) Inventors: Zvi M. Kedem, New York, NY (US); Davi Geiger, New York, NY (US); Salvatore Paxia, New York, NY (US); Arash Baratloo, New York, NY (US); Peter Wyckoff, New York, NY (US)

(73) Assignee: Ondotek, Inc., New York, NY (US)

( * ) Notice: Subject to any disclaimer, the term of this patent is extended or adjusted under 35 U.S.C. 154(b) by 0 days.

(21) Appl. No.: 10/268,898

(22) Filed: Oct. 11, 2002

(65) Prior Publication Data

US 2003/0037202 A1 Feb. 20, 2003

Related U.S. Application Data

(63) Continuation of application No. 09/690,058, filed on Oct. 16, 2000, now Pat. No. 6,477,624.
(60) Provisional application No. 60/163,954, filed on Nov. 8, 1999, provisional application No. 60/211,291, filed on Jun. 13, 2000, and provisional application No. 60/240,138, filed on Oct. 13, 2000.

(51) Int. Cl.[7] ........................ G06F 13/368; G06F 13/16
(52) U.S. Cl. ...................... 711/147; 711/130; 709/216; 714/29
(58) Field of Search ................................ 709/216, 219; 711/1, 6, 118, 124, 130, 147, 162, 165, 202; 714/29

(56) References Cited

U.S. PATENT DOCUMENTS

| 5,146,568 A | | 9/1992 | Flaherty et al. |
| 5,230,052 A | | 7/1993 | Dayan et al. |
| 5,280,627 A | * | 1/1994 | Flaherty et al. ................ 713/2 |
| 5,390,331 A | | 2/1995 | Yui |
| 5,452,454 A | | 9/1995 | Basu |
| 5,471,674 A | | 11/1995 | Stewart et al. |
| 5,727,170 A | | 3/1998 | Mitchell et al. |
| 5,802,297 A | | 9/1998 | Engquist |
| 5,815,706 A | | 9/1998 | Stewart et al. |
| 5,819,065 A | * | 10/1998 | Chilton et al. ............... 395/500 |

(List continued on next page.)

Primary Examiner—B. James Peikari
(74) Attorney, Agent, or Firm—Rothwell, Figg, Ernest & Manbeck

(57) ABSTRACT

A data image management system (DIMS) that includes a local data image manager (LDIM), a remote data image manager (RDIM), and a remote persistent storage device (RPSD). The LDIM communicates with the RDIM through a direct communication link or through a communication network. The RDIM can store data on and retrieve data from the RPSD. In an environment where an LDIM has been installed in a computer having a "local" persistent storage device (LPSD), the DIMS allows for the storing of the LPSD's data image on the RPSD, with the LPSD serving as a persistent, consistent cache of the data image. The data image stored on the RPSD is referred to as the "master data image" and the data image cached on the LPSD is referred to as the "local data image" or "cached data image." The LDIM functions to intercept read/write requests that are intended to be received by the LPSD. The read/write requests specify an address of the LPSD. Upon intercepting a read request, the LDIM is programmed to determine whether the portion of the cached data image that is stored at the specified address is up-to-date. If it is up-to-date, the LDIM retrieves the requested data from the LPSD and passes the data back to the component or device from which it received the request. If it is not up-to-date, the LDIM transmits the read request to the RDIM. Upon receiving the read request, the RDIM locates and reads the requested data from the master data image stored on the RPSD and then transmits the data back to the LDIM.

44 Claims, 9 Drawing Sheets

U.S. PATENT DOCUMENTS

| | | |
|---|---|---|
| 5,828,887 A | 10/1998 | Yeager et al. |
| 5,896,322 A * | 4/1999 | Ishii ...................... 365/189.04 |
| 5,918,229 A | 6/1999 | Davis et al. |
| 5,963,941 A | 10/1999 | Hirakawa |
| 5,963,971 A * | 10/1999 | Fosler et al. ................. 711/114 |
| 5,987,506 A * | 11/1999 | Carter et al. ................. 709/213 |
| 5,991,542 A * | 11/1999 | Han et al. ................... 395/712 |
| 5,991,875 A | 11/1999 | Paul |
| 5,996,028 A | 11/1999 | Niimi et al. |
| 6,185,580 B1 * | 2/2001 | Day, III et al. ............. 707/205 |
| 6,434,695 B1 * | 8/2002 | Esfahani et al. ................ 713/2 |

* cited by examiner

HOST COMPUTER PO COMMANDS

DATA IMAGE MANAGEMENT VIA EMULATION OF NON-VOLATILE STORAGE DEVICE

This application is a continuation of U.S. patent application Ser. No. 09/690,058 filed on Oct. 16, 2000, now U.S. Pat. No. 6,477,624, which claims the benefit of the following three U.S. Provisional Patent Applications: (1) U.S. Provisional Patent Application No. 60/163,954, filed, Nov. 8, 1999; (2) U.S. Provisional Patent Application No. 60/211,291, filed, Jun. 13, 2000; and (3) U.S. Provisional Patent Application No. 60/240,138, filed, Oct. 13, 2000. All of the above mentioned patent applications are incorporated herein in their entirety by this reference.

BACKGROUND OF THE INVENTION

1. Field of the Invention

The present invention is generally related to persistent storage devices, and, more specifically, to a system and method for enabling the centralized storage and maintenance of persistent storage device data images.

2. Discussion of the Background

In general, the ability to store and access data is critical for computers. For example, when turned on, a computer (e.g., a personal computer ("PC")) accesses, and prepares (or "boots") the operating system from its local persistent storage device (e.g., "hard disk"). Once the booting is finished, the contents of the hard disk are accessible and available to the user. The contents of the hard disk (also referred to as the hard disk's "disk image" or "data image") define the user's personalized environment: the operating system (such as Windows 98 SR-2, Linux, etc.), the software applications (such as word processors, spreadsheet programs, web browsers, etc.), the data files (such as documents, spreadsheets, images, or cookies), and any additional customization (such as whether a particular web browser, such as Netscape Navigator or Internet Explorer, is automatically launched when an HTML file is accessed).

A hard disk is but one example of a persistent storage device. A persistent storage device can be defined as follows:
- (a) it is a physical device that is physically attached to a computer using a standard physical interface (e.g., a hard disk attached with an IDE cable). This physical interface provides the link between the persistent storage device and the computer. (If the persistent storage device under consideration is a hard disk, the physical interface is frequently called a connector and is typically attached to a hardware component on the computer called the disk adapter, which itself provides the logical link between the persistent storage device and the computer);
- (b) it contains a local permanent medium (e.g., magnetic media) for storing a sequence of bits, (i.e., data), typically organized according to a particular file structure. The bits are collectively called the persistent storage device data image (PSDDI), or data image (DI) for short. When the persistent storage device is a hard disk, the persistent storage device data image will frequently be called a "disk image." Typically, the local permanent medium is capable of storing a large amount of data (e.g., more than 10 Megabytes);
- (c) it has the ability to selectively read and write any part of the data image; and
- (d) it allows the computer to which the device is attached to selectively read and write any part of the data image through a standard set of interface protocols.

The scope of persistent storage devices includes all hard disk drives implementing interfaces such as ST506/412, ESDI, SCSI, IDE, ATA, ATAPI, ATA-E and EIDE, read/write CD ROM drives, ZIP drives, JAZ drives, floppy drives and the like. In addition, the present invention applies to embedded systems' persistent storage devices, such as, Flash, and DiskOnChip.

Any two "hardware-similar" PCs having the same data image would appear the same to the user. In contrast, if a user's data image is replaced by a significantly different data image, the user will most likely see an unfamiliar desktop displayed on the PC's display screen. What would be even more disturbing and likely to make the PC unusable to the user, is the fact that the new data image would have different software and data files from the original data image. Thus, it is the data image that makes a user's PC the user's "Personal Computer," and it is the most valuable and essentially the only irreplaceable component of the PC.

The conventional PC is "governed" by the contents of its hard disk, and therefore the limits of the installed software become the limits of the user. Once the user's needs change, or grow beyond the capabilities of the installed software, the user has to deal with upgrading or installing a new OS or application software, a costly, time consuming, and frequently aggravating process even for a professional. Moreover, in environments such as offices within large companies or firms, this problem is compounded because the hard drive on each individual PC needs to be accessed in order to perform an upgrade. In addition, such upgrades may cause some existing software not to work properly, in effect corrupting the previously stable data image.

There are several computer architecture models that attempt to solve the above problem. These architecture models and their respective disadvantages are described below.

Network Computer: A network computer (NC) is a lightweight computer with a simple built-in operating system. After booting, it connects to a remote computer for file system access. Software programs reside on the remote computer. Once invoked, they are downloaded to the NC where they execute. The applications are typically based on Java or JavaScript. The problems with an NC are that existing applications have to be reengineered for this platform, and an NC has limited capability to perform computing operations when not connected to the network. If the software on the NC is badly corrupted, it may not be able to boot or access the network and therefore the NC will not be functional. Thus well functioning local software is required for operation. Further, NCs have no notion of providing a remote image to a local computer transparently to the operating system executing on the local computer.

Thin Client: The local computer, termed the thin client, is used mainly for display and user input. Applications execute on a server and the thin client opens a window to the server to interact with the applications. For the thin client to work, a continuous connection from the thin client to the server is needed. A thin client is typically running on a standard computer; however, the thin client technology does not provide any means for remotely administering or upgrading of the computer's software. In addition, thin client technology requires that the data files (such as Word documents) be manipulated on the server, which requires that they not be encrypted during such manipulation. Also, well functioning local software is required for operation. Thin clients are also operating system specific.

Remote booting and Disk-less computers: Some operating systems, such as Unix, MacOS and Windows 95 allow computers to boot from an image on a remote computer. This feature is typically used for disk-less computers. However, even if the computers have a disk drive or other persistent storage device, it is only used as a swap space (runtime operating system scratch space), and the contents do not persist across boot sessions. Remote booting and diskless computers do not work off line.

Remote File System Technologies: They allow mounting of a remote file system to a local computer (e.g., NFS). Remote file systems can be provided by a remote computer or by a remote network disk. These technologies allow a computer to access data and programs stored on remote server(s). However, system software built into the operating system is required. Remote file technologies do not allow remote administration of the computer. They also require functioning software on the computer. In addition, remote file system technologies do not work off line whilst the present invention does work off line.

Automatic file propagation: Software tools such as Unix's rdist, allow files to be synchronized across networked computers; however, such tools are operating system and file system specific, and require a functioning operating system for them to work.

What is desired is a system and/or method that overcomes these and other disadvantages of conventional computers and computer architectures.

SUMMARY OF THE INVENTION

The present invention provides a persistent storage device data image management system, or data image management system (DIMS) for short, that is able to solve the above described problems that users encounter when upgrading and/or maintaining their computers.

According to the present invention, the DIMS completely de-couples a persistent storage device data image "seen" by the computer from a persistent storage device attached to the computer (also referred to as the local persistent storage device (LPSD)). The DIMS includes a local data image manager (LDIM), which is required to be installed (either by the manufacturer, the distributor, a user, or a technician) on the user's computer, a remote data image manager (RDIM), and a remote persistent storage device (RPSD). The LDIM communicates with the RDIM through a direct communication link or through a communication network (e.g., a local area network, a wide are network, the Internet, the public switched telephone network, a wireless network, etc). The RDIM can store data on and retrieve data from the RPSD.

In an environment where an LDIM has been installed in a computer having a "local" persistent storage device (LPSD), the DIMS allows for the storing of the LPSD's data image on the RPSD, with the LPSD serving as a persistent, consistent cache of the data image. The data image stored on the RPSD is referred to as the "master data image" and the data image cached on the LPSD is referred to as the "local data image" or "cached data image." In general, there is no requirement that the LPSD and the RPSD be of the same type. For instance, the LPSD could be a DiskOnChip and the RPSD could be a hard disk. Also, the RPSD may be a specialized smart device rather than being installed in a general purpose computer.

The purpose of the LDIM is to imitate the LPSD. That is, the LDIM, from the computer's perspective, appears exactly like the LPSD. More specifically, the LDIM functions to intercept and process requests that are intended to be received by the LPSD, which may not be in fact installed in the computer. Common are read/write requests specifying an address (for example, in the case where the LPSD includes a hard disk, the read/write requests specify a sector of the hard disk).

Upon intercepting a read request, which specifies an address, the LDIM is programmed to determine whether the portion of the cached data image that is stored at the specified address is up-to-date (i.e., whether the portion of the cached data image reflects the latest changes made to the master data image). In one embodiment, this feature is implemented by having the LDIM request a "modified-list" from the RDIM each time the LDIM is powered on and (optionally) to have the RDIM provide to the LDIM updates to the modified list whenever a modification to the master data image occurs. The "modified-list" is a list of all the "parts" or "portions" of the master data image that have been modified since the last time the LDIM was informed of modifications to the master data image. (For example, if the master data image is a data image from a hard disk, the list of parts could be a list of the disk's sectors.) Thus, if the LDIM receives a read request specifying an address that is on the modified list, the LDIM will know that the portion of the cached data image stored at the specified address is not up-to-date.

If the LDIM determines that the cached data image has the most up to date version of the requested data, then the LDIM (1) retrieves the requested data from the LPSD by issuing a read request to the LPSD and (2) passes the retrieved data back to the component or device from which it received the request. If the cached data image does not have the most update version of the requested data, then it must be stored on the RPSD (i.e., the master data image). In this case, the LDIM transmits to the RDIM a read request message, which may include the address specified in the intercepted read request. Upon receiving the read request message, the RDIM locates and reads the requested data from the master data image stored on the RPSD and then transmits the data back to the LDIM.

Upon intercepting a write request, the LDIM may write the data to the LPSD, if there is one, and transmits the data to the RDIM so that the RDIM can update the master data image thereby ensuring that the master data image is up to date. The LDIM may either transmit the data to the RDIM substantially concurrently with writing the data to the LPSD or wait until some later time (e.g., if the computer is not currently connected to the network or if the network is heavily loaded).

On requests other than read or write request, such as PND (Program Non Data request for IDE hard disks), the LDIM returns a response as required by the standard protocol for communicating with the LPSD.

It is contemplated that in some embodiments there will be no LPSD. In this case, there is no cache as described above. Instead, all read/write requests for data that are received by the LDIM are transmitted to the RDIM. In the case of a read request, the RDIM retrieves the requested data and transmits the data back to the LDIM. In this manner, a user of the computer has access to his or her personalized data image even when the computer is not equipped with a local hard disk or other persistent storage device. It is also contemplated that to gain the greatest benefit from the invention the computer in which an LDIM is installed should, as often as is possible, be connected to a network so that the LDIM can communicate with an RDIM.

From now, and without limiting the scope of the invention, the invention and its benefits will be described with respect to the particular embodiment where the LPSD is a hard disk. Once the DIMS is in place, the user need not concern him or herself with the task of upgrading his or her operating systems, application programs, data files, etc., following setting the appropriate agreements with the organization in charge of managing the master data images on RPSDs. This is because software patches and upgrades can be first performed on the master data image by an experienced system administrator. After the system administrator performs the upgrade on the master data image, the DIMS transparently ensures that these patches and upgrades are propagated to the local hard disk, as described above. Similarly, as described above, the DIMS automatically backs up all data files that are stored on the local hard disk that have been modified. This is accomplished by the LDIM transmitting the modified files (or sectors) to the RDIM so that the RDIM can update the master data image. In this manner, the master data image is kept up to date.

Additionally, the DIMS can cache multiple master data images on the local hard disk. This is advantageous where the computer has more than one user and each user has his or her own personalized data image. The DIMS uses a standard coherent caching algorithm (such as described in the standard textbook: Almasi and Gottlieb, *Parallel Computing*, $2^{nd}$ edition, 1994, the entire contents of which are incorporated herein by this reference.) and implementation to store the cached data images and maintain their coherency with the corresponding master data image. When the LDIM is unable to communicate with the RDIM, the computer in which it is installed can still operate to the extent that the required software and data is cached on the local on the local hard disk.

Preferably, the DIMS provides this functionality below the operating system and all of its components (including device drivers) and BIOS routines specific to the hardware of the computer. Thus, the DIMS is completely transparent to the operating system and all applications of the computer. This allows the DIMS to be independent of any operating system or software installed on the computer. At the same time, it has the ability to provide the computer with any type of operating system compatible with the computer's hardware, software, and other data.

This enabling technology provides a rich gamut of functionality that completely changes the way computers are utilized. A user can use any "hardware compatible" computer as their "Personal Computer," as the new computer transparently, without the user's intervention, obtains over a network only those parts of the user's data image needed for the current execution, with the other parts following later. For instance if the user wants to start execution by editing a document and then at a later point in time create and send an e-mail, a word processor will be downloaded before the e-mail program. A user's computer can be replaced by a new one with the ease of "plug and play," retaining all the user's desired previous software, data, and settings. The user is presented with practically unlimited disk space, as the size of the master data image is not constrained by the size of a local disk.

The software and data cached on the local disk provide instantaneously for the normal needs of the user, thus minimizing the network traffic between the location where the master copy is stored and an individual computer. As the user's software does not execute remotely, data files are kept private through encryption—which can be done even on the local hard disk, with LDIM encrypting and decrypting the data as needed.

The DIMS is easy to integrate into existing platforms, provides, for the first time, a complete automated management and administration capability in LANs and over the Internet, while maintaining fully the rich computer functionality. The DIMS creates the following benefits: increased user satisfaction and productivity, removal of the need for users to spend time on administration or wasting time waiting for somebody to repair the damage they may have caused to their local disk contents, and in general tremendous savings in both the explicit and implicit parts of total cost of ownership.

In today's computers, to access a hard disk, the following sequence of steps are performed:
1. An application wishing to read or write a file issues a request to an operating system API for such action.
2. The operating system checks if the request can be serviced from its file cache, if such cache is maintained.
3. On a miss, or write through, the operating system directs the request to an appropriate device driver for the physical device to which the request was made.
4. Optionally, the device driver may issue the request to the computer's BIOS.
5. The device driver (or BIOS) issues the request to a disk adapter, which is a component typically installed on the motherboard of the PC.
6. The disk adapter uses a physical connection to send the request to the controller of the local hard disk.

It is an object of the present invention to implement the LDIM to intercept the request from the disk adapter so that the controller of the local persistent storage device will not receive it. Alternatively, it is an object of the invention to implement the LDIM to intercept the request from the device driver (or BIOS) so that the disk adapter does not receive it.

There are a number of ways in which this interception can be done including system management mode, a PC card, building it with new chips on the motherboard or the persistent storage device, or building the functionality into the adapter chip. The Alternative Embodiments section of this document elaborates on these embodiments.

It is another object of the present invention to allow the DIMS to encrypt writes and decrypt reads using a password, a pass-phrase, or a key supplied by system software or the user. As commonly done, the key itself could be kept encrypted and only be decrypted after a password or a pass-phrase are supplied. The obvious advantage of encryption is to secure the local data, the remote data, and the data transferred over the network. Furthermore, this functionality is transparent to the user, the operating system, and software applications.

It is another object of the present invention to allow the DIMS to work with any operating system presently available on the market (including DOS, Windows 98/NT/2000/ME, Unix, Novell, OS/2, BeOS) or any future operating system that supports any of the standard persistent storage device interfaces.

It is another object of the present invention to allow the DIMS to work with any standard hard drive interface.

It is another object of the present invention to make the above functionalities available for any existing or future computer hardware that uses any of the current or future persistent storage device interfaces.

It is another object of the present invention to provide a transparent mechanism for upgrading software and hardware drivers by means of pulling changes as needed when the computer is connected to the network. This is as opposed to current operating system specific push mechanisms, such as Unix's rdist.

It is another object of the present invention to provide a mechanism for allowing users to roam from computer to computer and receive their personal operating system, personalization customizations, applications, and data files, no matter what operating system, applications, and data files were previously being used on that computer.

It is another object of the present invention to provide a mechanism allowing the DIMS to transparently present a large amount of storage space (bound only by the addressing size limitations), regardless of the amount of space available on the local physical persistent storage device.

Still other objects and advantages of the invention will in part be obvious and will in part be apparent from the specification.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The following detailed description of an embodiment of the invention is of the best presently contemplated mode of carrying out the invention. This description is not to be taken in a limiting sense, but is made merely for illustrating the general principles of the invention.

Figure 1:
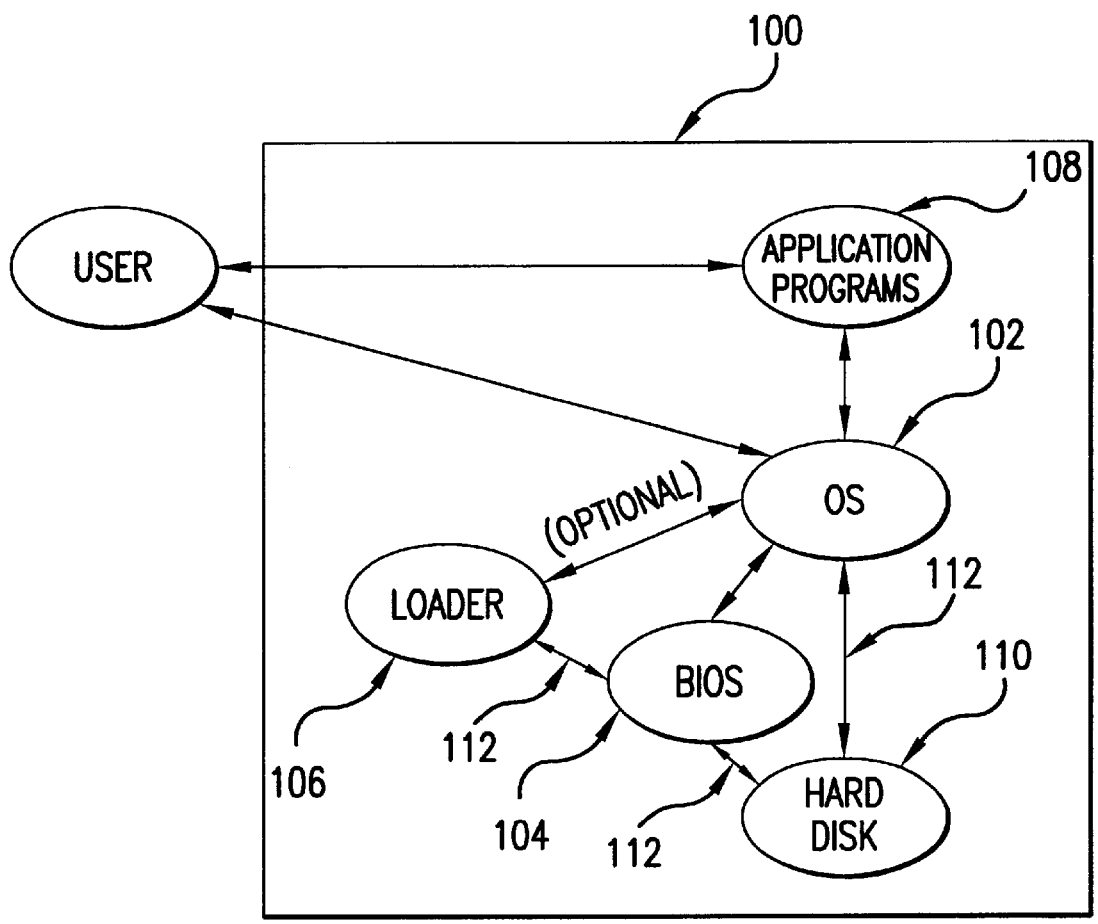
FIG. 1 depicts a functional block diagram of a standard PC indicating the connection and interaction of a typical persistent storage device.

FIG. 1 depicts a functional block diagram of a conventional computer 100 (also referred to as "PC"). As shown, computer 100 includes an operating system (OS) 102, a basic input/out system (BIOS) 104; a loader 106, a variety of software programs 108 and a local persistent storage device (e.g., hard disk) 110. As the figure exemplifies, operating system 102, BIOS 104, and loader 106 (through the BIOS) access storage device 110 through a standard interface/protocol 112 (e.g., the ATA/IDE interface/protocol). Conventionally, applications programs 108 do not access storage device 100 directly; application programs 108 rely on services provided by operating system 102 to access data stored on storage device 110.

Figure 2:
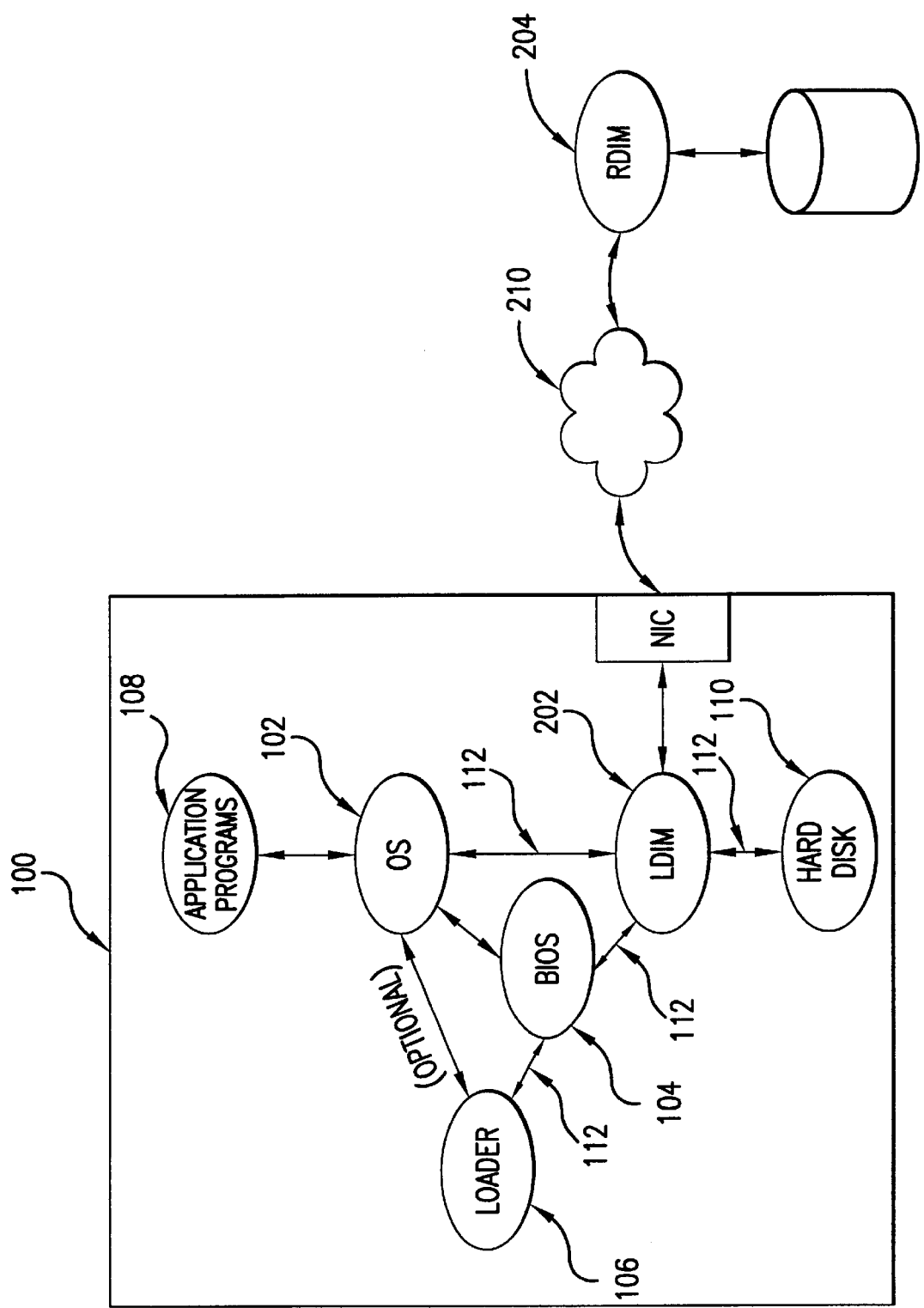
FIG. 2 depicts a computer and a data image management system (DIMS), according to one embodiment, for improving the operation of the computer.

FIG. 2 depicts computer 100 and a data image management system (DIMS), according to one embodiment, for improving the operation of computer 100. The DIMS is a client/server system, and thus includes a client 202 and a server 204. Client 202 is referred to as the "local data image manager" (LDIM) and server 204 is referred to as the "remote data image manager" (RDIM). The DIMS also includes a persistent storage device (PSD) 206 that can be read from and written to by RDIM 204. PSD 206 is referred to herein as "remote PSD 206" or "RPSD 206" because it is "remotely" located from computer 100. That is, RPSD 206 is not directly coupled to computer 100.

As shown in FIG. 2, LDIM 202 is installed in computer 100. More specifically, from a functional point of view, LDIM 202 is installed between storage device 110 and OS 102, and BIOS 104. LDIM 202, as shown in FIG. 2, communicates with OS 102 and BIOS 104 using standard interface 112; the same interface used by OS 102 and BIOS 104 to communicate with storage device 106. Additionally, LDIM 202 may be connected to storage device 110 and can read data from and write data to storage device 110 using standard interface 112. To OS 102 and BIOS 104, LDIM 202 "pretends" that it is storage device 110. Thus, LDIM 202 is completely transparent to OS 102 and BIOS 104.

LDIM 202 and RDIM 204 communicate with each other through a direct communication link or network 210 (e.g., a local area network, a wide are network, the Internet, the public switched telephone network, a wireless network, etc.).

As described in the Summary of Invention section, the DIMS allows for the storing of a data image on RPSD 206 with storage device 100 serving as a persistent, consistent cache of the data image. A data image stored on RPSD 206 is referred to as a "master data image" and a data image stored on storage device 110 is referred to as a "cached data image." RPSD 206 can be configured to store more than one master data image and storage device 110 can be used to cache more than one master data image.

Optionally, in one embodiment, LDIM 202 includes a "mini-booter" software program (not shown). In this embodiment, when computer 100 is powered on, LDIM 202 "forces" the "mini-booter" into computer 100's CPU (See FIG. 3). This is done by emulating a disk with the mini-booter installed as a loader. The mini-booter functions to authenticate the user (i.e., it may perform usemname/password verification). Additionally, if the DIMS has more than one RPSD 206, the user is prompted to select one. Preferably, the user will select the RPSD 206 that stores the master data image(s) that "belong(s)" to the user. After the mini-booter receives the selection from the user, the mini-booter communicates with LDIM 202 (this communication can use custom IDE commands, or reads and writes to reserved sectors) to request that LDIM 202 contact the RDIM 204 associated with the selected RPSD 206 to determine the list of available master data images for this user. (If the server cannot be contacted, some number of most recent user names, passwords, and images are cached on the LDIM 202, assuming a cache exists, and only those users can gain access). The mini-booter displays the list of available master data images and prompts the user to select one. The mini-booter communicates the selection to LDIM 202 and then either reboots the computer or resets the BIOS's disk geometry table to the geometry of the selected master data image. The latter case is preferred if the BIOS supports such a feature. In the former case, LDIM 202 emulates the selected image including the geometry of the image.

The mini-booter may also provide an interface for configuring and maintaining LDIM 202. Options such as whether to use Dynamic Host Configuration Protocol (DHCP) or a static IP address can be set from this interface.

As is evident from FIG. 2, LDIM 202 functions to intercept requests (for example, read/write requests) that are intended to be received by storage device 110. After a master data image is selected, upon intercepting a read request, LDIM 202 is programmed to determine whether the cached data image or the selected master data image has the most up to date version of the requested data. In one embodiment, this feature is implemented by having LDIM 202 request a "modified list" from RDIM 204 each time LDIM 202 is powered on and (optionally) to have RDIM 204 provide to LDIM 202 updates to the modified list whenever a modification to the master data image occurs. The "modified list" is a list of all the sectors of the master data image that have been modified since the last time LDIM 202 was informed of modifications to the master data image. Thus, if LDIM 202 receives a read request for a sector that is on the modified list, LDIM 202 will know that the cached data image (i.e., storage device 110) does not have the most up to date version of the data.

If LDIM 202 determines that the cached data image has the most up to date version of the requested data, then LDIM 202 retrieves the requested data from storage device 110 and passes the data back to the component or device from which it received the request. If the cached data image does not have the most update version, then it must be stored on the RPSD 206 (i.e., the selected master data image). In this case, LDIM 202 transmits a read request to RDIM 204. Upon receiving the read request, RDIM 204 locates and reads the requested data from the selected master data image stored on RPSD 206 and then transmits the data back to LDIM 202. Upon intercepting a write request, LDIM 202 is programmed to write the data to storage device 110 and to transmit the data to RDIM 204 so that RDIM 204 can update the selected master data image thereby ensuring that the master data image is up to date. LDIM 202 may either transmit the data to RDIM 204 substantially concurrently with writing the data to storage device 110 or at some later time (e.g., when network traffic is low).

It is envisioned that a user who uses the DIMS would initially copy the data image stored on storage device 110 onto RPSD 206 and then always select that image as the master data image. Thus, in most cases the selected master data image on RPSD 206 would initially be identical to the cached data image on storage device 110. Of course, a small amount of space would need to be set aside on storage device 110 for cache data and any other data needed, such as encrypted keys. It is further envisioned that the user would then allow a professional system administrator to make updates to the master data image using RDIM 204.

The various data images stored on RPSD 206 may not require each its own fully dedicated storage space. For instance, if two data images contain the same word processor, that word processor may be stored only once. RDIM 204 will deliver the word processor as needed to both of the cashed data images.

RDIM 204 preferably includes image manipulation tools. The image manipulation tools allow system administrators to manipulate master data images stored on RPSD 206. For example, an administrator could create new images, copy images and delete images. In addition, it is advantageous to allow administrators to manipulate the contents of a master data image stored on RPSD 206. For example, software installation, registry manipulation, and operating system upgrades or restructuring can be performed on a master data image. The image manipulation tools allow centralized administration and upgrading and/or restructuring of operating systems, applications, and user data.

These updates to the master data image would be automatically propagated to the cached data image by virtue of the fact that LDIM 202 is made aware of the updates. As explained above, when LDIM 202 is powered on it requests the modified list from RDIM 204 and RDIM 204 sends to LDIM 202 updated information to be added to the modified list.

The DIMS can provide functionality to computer 100 even when storage device 110 is not present in computer 100. In this situation, LDIM 202 merely forwards all read/write requests to the appropriate RDIM 204. However, to minimize the network traffic and delays, using storage device 110 as a cache is necessary. When storage device 110 is used as a cache, the vast majority of requested blocks (this is likely to include the OS, recently used application, and data files) will most likely be stored in the cache, thus, no network traffic is needed. It should also be noted that the propagation of write requests from LDIM 202 to RDIM 204 for the purpose of updating the master data image can be timed to best utilize the network bandwidth. As an additional feature, since LDIM 202 receives all read requests, LDIM 202 can monitor software usage. That is, LDIM 202 can "meter" the use of any particular software program or data file and gather statistics on the usage patterns of various software programs.

Figure 3:
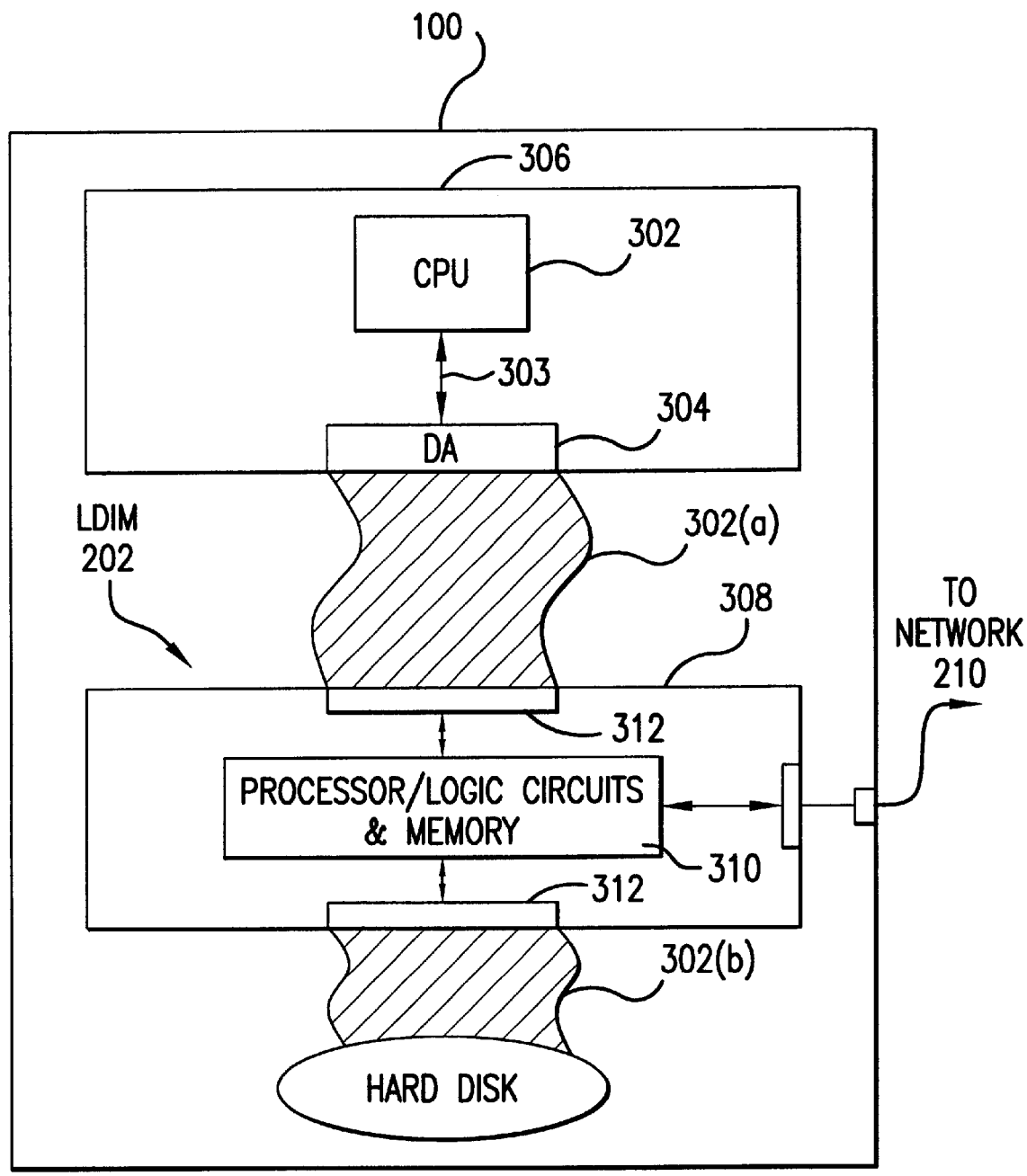
FIG. 3 depicts a schematic of a PC with an installed local data image manager (LDIM).

Referring now to FIG. 3, there is shown a hardware diagram of computer 100 and LDIM 202 according to one embodiment of the invention. In a typical computer, a ribbon connects a disk adapter 304 on the computer's motherboard 306 to a storage device (e.g., hard disk). However, in this embodiment of the invention, LDIM 202 comprises an LDIM card 308 (LDIM card 308 is a standard form card similar to an Ethernet card) that is connected to disk adapter 304 by a ribbon cable 302(a) and connected to storage device 110 by another ribbon cable 302(b), which is similar to ribbon cable 302(a). That is, in this embodiment of the invention, storage device 110 is not connected to disk adapter 304 as is the case in conventional computers. LDIM card 308 is equipped with an embedded processor, logic circuits, and memory 310 for enabling LDIM 202 to perform its functions.

To disk adapter 304 and storage device 110, LDIM 202 presents standard connectors and hardware/software interfaces 312, and therefore, LDIM 202 is completely interoperable with standard computer hardware and interfaces. To disk adapter 304, LDIM 202 "pretends" that it is storage device 110; to storage device 110, LDIM 202 "pretends" it is disk adapter 304. As the CPU 302 and software running on the computer 100 (including the OS) are not "aware" of this replacement, reads and writes that are transmitted by the disk adapter 304 are intercepted and processed by LDIM 202 as described above.

There is no need to modify the existing motherboard bus technology or the CPU 302 to disk drive adapter interface 303 or the adapter to the disk drive's controller interface: disk adapter 304 can use any protocol to interface with storage device 110 and/or LDIM 202, for example including ST506, SCSI, IDE, ATA, ATA-2-5, EIDE, ESDI.

Furthermore, disk adapter 304 can be coupled to the CPU 302 using a variety of different buses, for example, PCI, ISA, VESA LB, EISA, and MCA.

The particular embodiment of LDIM 202 that is described below implements the IDE protocol and consists of PIO modes 0 through 2. It is straightforward to implement other modes of operation by implementing their respective specifications. This embodiment is concerned with the method of re-directing the host's reads and writes. As such, the embodiment does not implement multi sector reads and writes. It is straightforward to implement the remainder of the specification and implementing PIO modes 0 through 2 does conform to the specification. Note that PI and PO commands include (i.e., specify) a sector.

Figure 4:
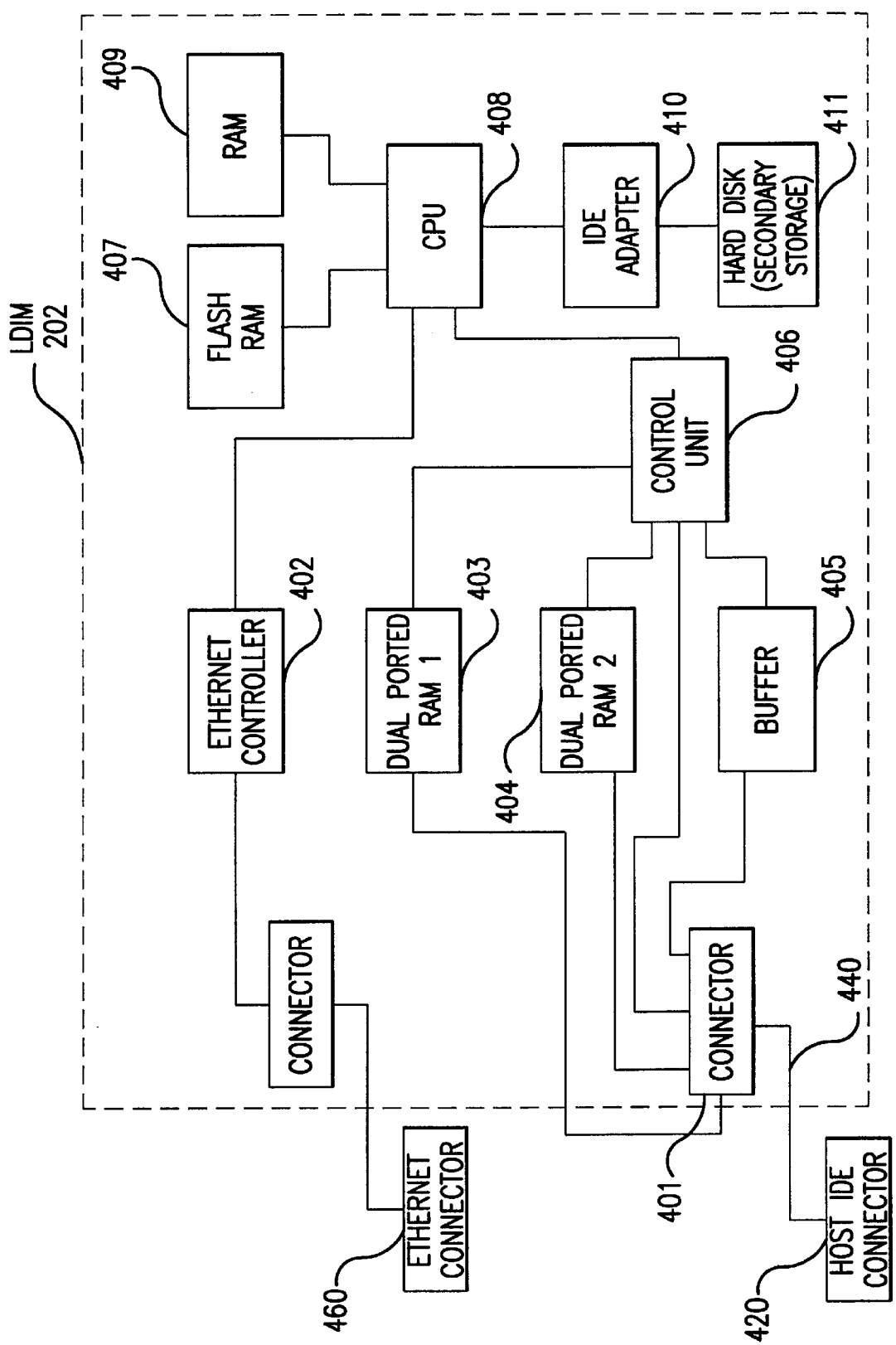
FIG. 4 depicts a block diagram of the components of an exemplary LDIM in accordance with the present invention.

FIG. 4 depicts a schematic of LDIM 202, which is for connecting to a computer's primary IDE interface 420, via a standard 40 pin IDE connector 440, and to a network interface 460. Element 401 is a 40 pin IDE flat cable connector. Element 402 is a network interface, which enables software executed by CPU 408 to communicate with other programs (e.g., RDIM 204 programs) over a network or communication link.

Element 403 is a dual ported RAM. In the illustrated embodiment, the dual ported RAM captures the data written by CPU 302 via its adapter 304 to the IDE interface. In particular, dual ported RAM 403 stores the data written onto the IDE Command register block (Feature Register, Sector Count, Sector/Cylinder/Drive-Head Registers and Command register), and Control Register Block (Control Register). Since element 403 is a dual ported RAM, CPU 408 can access its contents at any time thereby reading the parameters written by CPU 302 to the IDE drive.

Element 404 is a second dual ported RAM. It stores the Error and Status registers. It is written by CPU 408 and can be accessed by CPU 302 via adapter 304.

Element 405 is a buffer that stores data exchanged between adapter 304 and LDIM 202.

A Control Unit 406 is provided for controlling the dual ported RAMs and the buffer to implement the IDE protocol. LDIM 202 also includes internal RAM 409 that can potentially be used by the software module that implements the standard caching algorithm as a fast buffer cache and for storing that software module and other modules. A flash RAM 407 stores an initial control program loaded by the CPU 408, as well as the control program for control unit 406.

Finally, an IDE adapter 410 is connected to the CPU 408 and to the (optional) secondary storage device 411.

The elements 403, 404, 405, 406 can be implemented with a Xilinx XC4000 FPGA, or with a specialized ASIC. Element 408 can be any CPU, for example an Intel 80486.

In a preferred embodiment of the present invention, the objectives are achieved by connecting the aforementioned LDIM 202 to the standard IDE connector 420 of the primary IDE interface of computer 100. Preferably, a new Ethernet connector 460 is added in an empty PCI slot of computer 100, and the Ethernet connector 460 is linked with a cable to network interface 402.

Because IDE adapter 304 reads from the disk through the IDE connector 420, and since LDIM 202 is connected to IDE connector 420, if LDIM 202 correctly follows the IDE protocol, it appears as a standard IDE disk drive. Thus the present invention achieves its objectives without requiring the modification, removal or replacement of the system IDE adapter or the use of specialized device drivers or BIOS, or additional software.

Attaching LDIM 202 in accordance with the present invention to IDE connector 420 allows LDIM 202 to monitor all the information being transmitted by CPU 302 to the disk drive 110. This includes all the commands because the set of registers implemented with the dual ported RAMs is identical to the set of registers of disk drive 110.

Figure 5A:
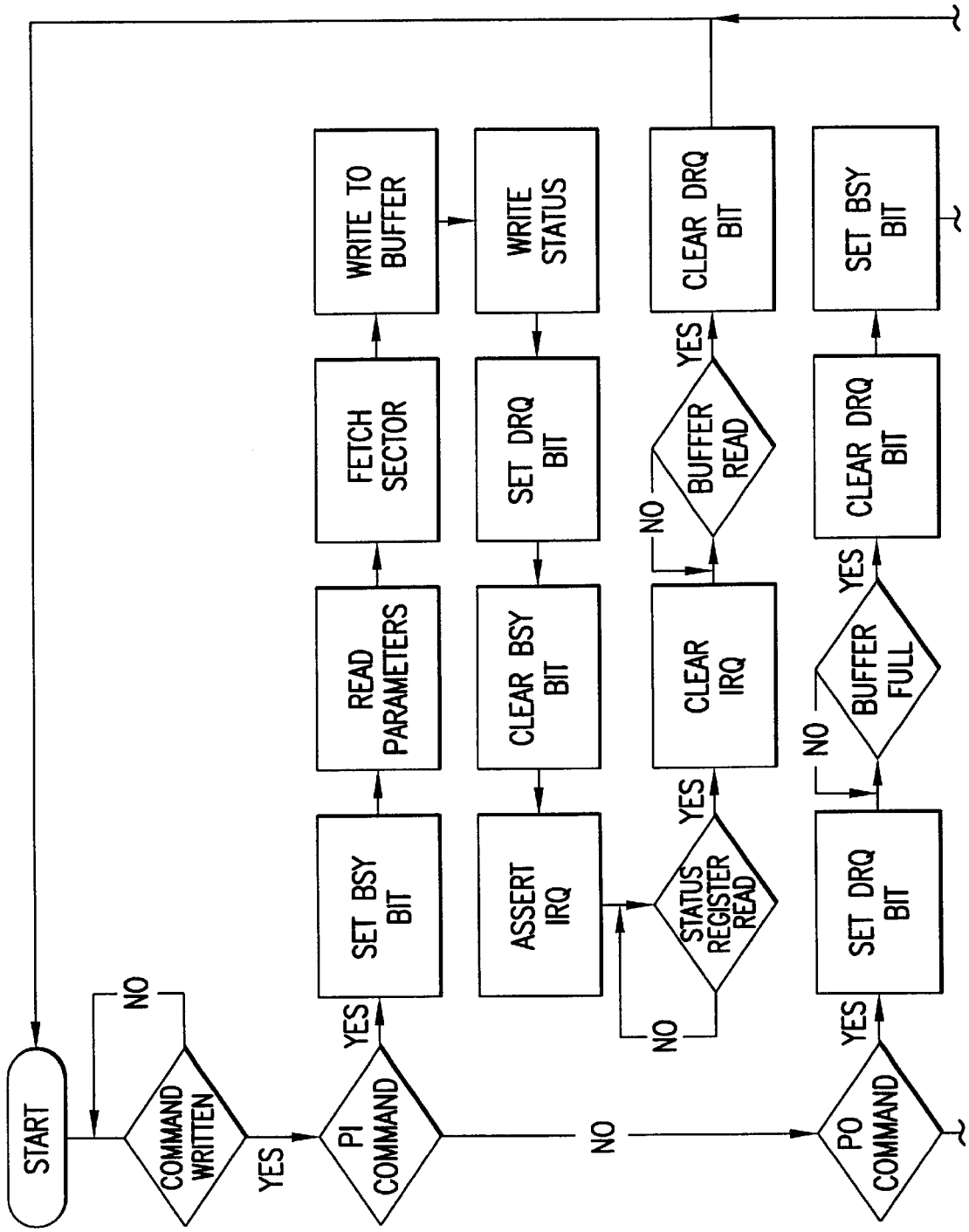
FIG. 5 depicts a flowchart of the LDIM control program.
Figure 5B:
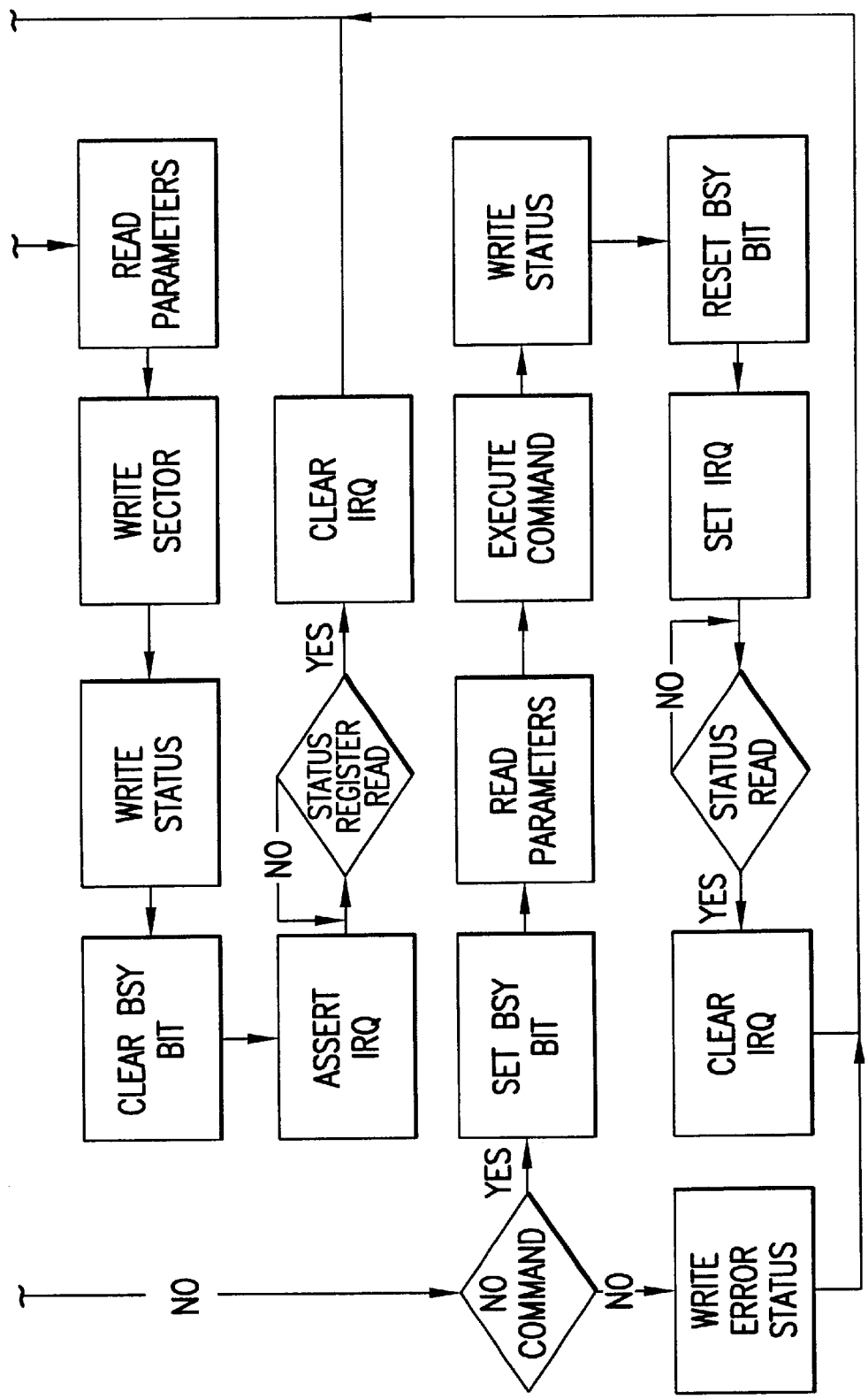

The flowcharts depicted in FIGS. 5–8 illustrate an example of disk activity that occurs when an LDIM 202 in accordance with the present invention is installed in a computer. The flowchart depicted in FIG. 5 illustrates the process performed by the LDIM 202 software (not shown) that is stored in flash RAM 407 and that functions to simulate any IDE command.

As depicted in FIG. 5, no action occurs until CPU 302 writes a command to the command register (not shown) that resides in dual port RAM 403. When this occurs, control unit 406 generates an interrupt to CPU 408. An interrupt service routine immediately reads the command from the command register, and selects either a PI, PO, or ND handling module depending on the command class of the command written into the command register (PI, PO, or ND).

When a PI command is executed (i.e., CPU 302 is seeking to retrieve a data sector), the PI handling module sets the BSY bit, reads the parameters from the dual ported RAM 403, and then fetches the sector that is being requested by CPU 302. The sector is either fetched from the cache 110 or from an RPSD 206. As described above, the sector is fetched from cache 110 if the data stored there is up-to-date, otherwise the sector is fetched from RPSD 206 (i.e., the PI handling module sends a read request, which indicates the requested sector, to RDIM 204, RDIM 204 retrieves the requested sector from RPSD 206, and RDIM 204 sends the requested data sector back to the PI handling module). After the data sector is fetched from either local disk 110 or an RPSD 206, it is stored in buffer 405, dual ported RAM 404 is updated with the new status information, the DRQ bit is set, the BSY bit is cleared and, if interrupts are enabled, an interrupt to CPU 302 is generated. The PI handling module then waits until CPU 302 reads the status register. When this happens, the IRQ line is de-asserted, and the PI handling module waits until the contents of buffer 405 have been completely read by CPU 302. Then the PI handling module clears the DRQ bit and control passes back to the beginning.

When a PO command is executed (i.e., CPU 302 is seeking to write data to a sector), the PO handling module first sets the DRQ bit and then waits until buffer 405 is full. The handling module then clears the DRQ bit and sets the BSY bit, then reads the parameters from the dual ported RAM 403, and finally writes the sector specified in the PO command. The actual writing is handled by the software module that implements the above mentioned caching algorithm, which may perform the write to the fast buffer cache, the local persistent storage device 110, or to RDIM 204 or to any combination thereof. After the sector is written, the status is written and the BSY bit is cleared. At this point the IRQ line is asserted, and the handling module waits until CPU 302 reads the status register. Then the IRQ line is cleared and the process goes back to the beginning of the control program main loop.

When an ND command is executed, the ND handling module sets the BSY bit, reads the parameters from the dual ported RAM 403, and then executes the command. The status is then written, the BSY bit is reset, and the IRQ line is asserted. The handling module waits until the status register is read by CPU 302, and then clears the IRQ line. The process then goes back to the beginning. When a non-valid command is detected, the handling module writes the correct error value to the error register and the process returns to the beginning of the main loop.

Figure 6:
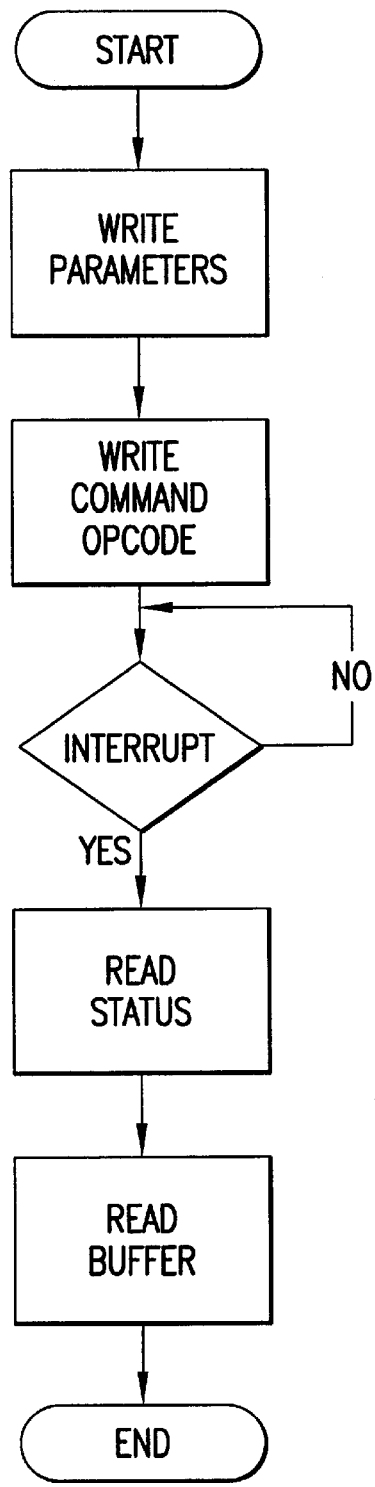
FIG. 6 depicts a flowchart of the PI (PIO In) commands executed by a computer.

FIG. 6 depicts the flowchart of the PI commands executed by CPU 302. The parameters are written onto the command block registers and the command op-code is written onto the command register. The computer's operating system then waits for an interrupt. When LDIM 202 asserts the IRQ line, CPU 302 reads the status register (which makes LDIM 202 de-assert the IRQ line), and reads the buffer.

Figure 7:
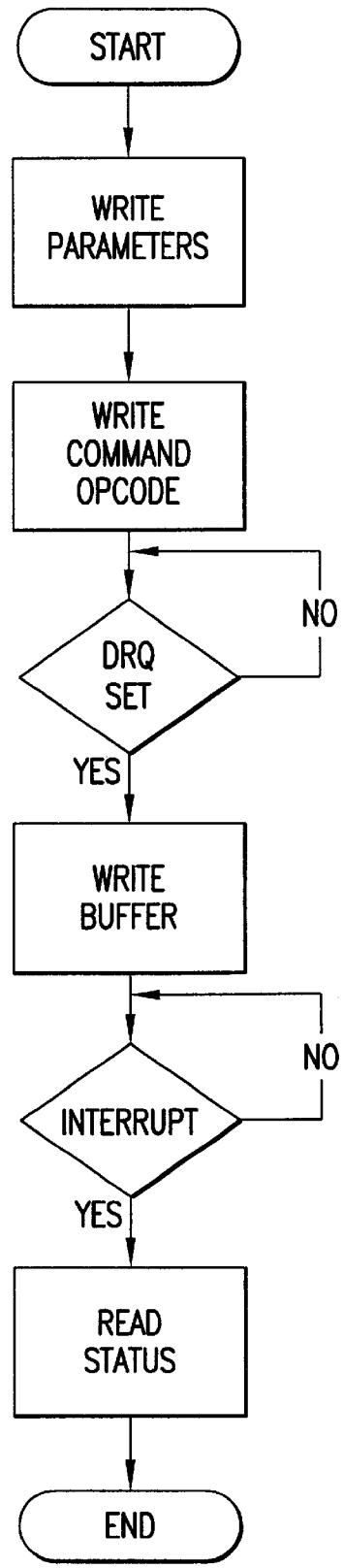
FIG. 7 depicts a flowchart of the PO (PIO Out) commands executed by a computer.

FIG. 7 depicts the flowchart of the PO commands executed by CPU 302. The parameters are written to the command block registers and the command op-code is written to the command register. Then the operating system 102 waits for the DRQ bit on the status register to be set. When LDIM 202 does this, the operating system 102 writes the buffer and waits for an interrupt. When LDIM 202 asserts the IRQ line, CPU 302 reads the status register (which makes LDIM 202 de-assert the IRQ line).

Figure 8:
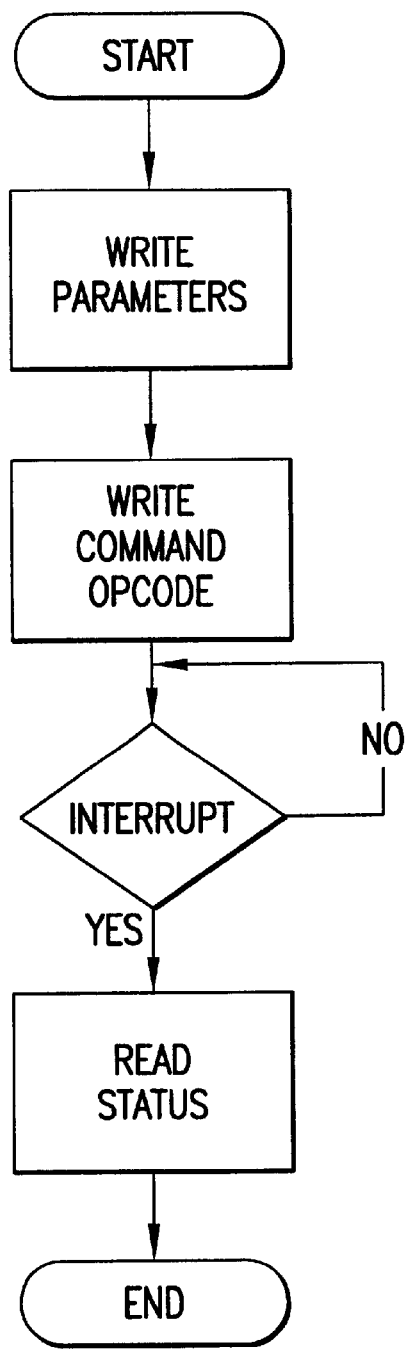
FIG. 8 depicts a flowchart of the ND (Non Data) commands executed by a computer.

FIG. 8 depicts the flowchart of the ND commands executed by CPU 302. The parameters are written to the command block registers and the command op-code is written to the command register. Then the operating system waits for an interrupt. When LDIM 202 asserts the IRQ line, CPU 302 reads the status register (which makes LDIM 202 de-assert the IRQ line).

Although product names of several specific circuit elements used in preferred embodiments of the present invention have been identified herein, it is recognized that any circuit element chip which performs functions similar or equivalent to the components described here may be substituted with no change in the functionality of the invention. The present invention is therefore not limited to the specific circuit elements identified herein, and changes in such circuit elements may be made to accommodate such consideration as cost reduction or other reasons.

Alternative Embodiments of the Invention:

While the invention has been particularly shown and described with reference to preferred embodiments thereof, it will be understood by those skilled in the art that the foregoing and other changes in form or detail may be made therein without departing from the scope of the invention.

There are a number of ways to intercept the read/write requests that are intended to be received by a persistent storage device and to implement LDIM 202. For example, on Intel 386 and above processors, the system management mode can be employed to redirect communication to/from disk adapter 304 to a specialized program running on CPU 302. In this case, either the ports for accessing adapter 304 need to generate system management interrupts or adapter 304 needs to be modified to generate system management interrupts after some quantum of the request has been made (e.g., for a write of a single sector, after the 512 bytes of data have been collected by the adapter). In the latter case, adapter 304 must be able to handle requests for disk accesses normally, for example when the system management mode code needs to access the persistent storage device 110.

Another approach is to add the interception and LDIM implementation on the motherboard 306 itself; the motherboard 306 would be augmented to route requests for the adapter to a physical unit (not shown) on the motherboard that would handle the interception and implement the LDIM functionality.

Another approach is to add the interception and implementation of the LDIM onto the physical persistent storage device 110. This functionality would be added before the device's controller (not shown) handles requests.

Another approach is to augment the adapter 304 on the motherboard 306 to perform the interception.

The approach employed in the embodiment described in detail above is to insert a card in between the cable connecting an x86 motherboard 306 to an IDE hard disk 110. This embodiment should in no way be seen as limiting the scope of the present invention to this type of embodiment or to these types of components.

It should be noted that when the computer 100 already has a network interface card (NIC), the LDIM need not have its own NIC. That is, the LDIM can be connected to the existing NIC and provide routing and Network Address Translation (NAT) for the computer. The advantage of this configuration is that the computer does not require an additional IP (Internet Protocol) address. It is also possible to use a single network connection and single IP address for both the LDIM and the computer. In this case, internal logic would determine whether a network packet was directed to the LDIM, or whether to pass the packet through to the computer.

Benefits of the Invention:

Because the DIMS is capable of updating the cached data image "at its convenience," that is in a "pull" rather than a "push" mode, the DIMS allows all of a computer's software (operating system, software applications, and other data) to be installed and maintained at a remote site, by modifying the data image stored there. This gives users an unprecedented benefit as it requires no support from the local operating system or application software.

By performing the updates pro-actively and below the operating system level, substantial performance and maintainability benefits are achieved in a platform independent manner. This includes maintaining the software so its most current version is available, and easy installation of additional software.

Frequently, the contents of various data images partially overlaps, this is true for instance for operating system files for images in which the same operating system is installed. In this case, the common parts of a set of images may be stored only once, and then upgrades and modification to the common parts may be more efficient In contrast to existing vendor centric solutions (thus of limited capability solutions) the present invention provides a comprehensive solution to remotely install and administrate any operating system on any computer (as long as the operating system and the host hardware are compatible). This results in a dramatic reduction in the total cost of computer ownership.

A computer can boot a different, up-to-date, or customized version of the operating system and software each time it boots. For instance, a user following an agreement with his Internet Service Provider (ISP), may at each boot time get a different version of trial software, updated operating systems components, or new advertising images as wallpaper.

The user may also transparently use Application Service Providers (ASPs). In this case, his or her master data image will include the ASP's application software, which he will access as if it were resident on a local persistent storage device. The ASP can also "unlock" and "lock" access to such application software at will, adding the software to the master data image, or removing the software from it. In this way, the ASP can easily rent and sell software applications.

The physical media used to remotely store the master data images may be stored at highly available, reliable servers where disk mirroring techniques such as RAID can be used to make the data fault tolerant.

If a computer becomes non-functional (including the case when it cannot even boot) because of corruption of its operating system files, a correct image can be reloaded from a master data image, relying on the direct network connection between the LDIM and the RDIM.

When a user has difficulties or does not understand the behavior of the operating system or applications, technical support can evaluate the situation remotely and help the user (and if necessary repair the configuration), as it has access to the master data image.

Because the physical data image is stored remotely, operating systems, applications and other data may be updated on the remote persistent storage device(s) by Information Technology (IT) professionals (through high-level interfaces such as NTFS).

Also, because the physical data image is stored remotely, remote servers hosting the remote persistent storage devices may automatically update software, drivers, etc., by interacting with the appropriate software vendors.

A computer including a LDIM can be used by multiple users at different times, with each user's master data image being transparently provided to him. Also, a user can choose which master data image to use.

As the LDIM can include encryption/decryption capability, the images can be stored encrypted on the remote persistent storage device and on the local persistent device, if any. That is, before the LDIM performs a write, the LDIM encrypts the data to be written and then writes the encrypted data. Similarly, when the LDIM process a read request, it first reads the data (either from the cached data image or from the master data image) and then decrypts the data before passing the data to the CPU of the computer.

It will thus be seen that the objects set forth above, among those made apparent from the preceding description, are efficiently attained and, since certain changes may be made in carrying out the above methods and in the devices as set forth without departing from the spirit and scope of the invention, it is intended that all matter contained in the above description and shown in the accompanying drawings shall be interpreted as illustrative and not in a limiting sense. Thus, the breadth and scope of the present invention should be defined only in accordance with the following claims and their equivalents.

What is claimed is:

1. A computer, comprising:
    a processing unit;
    a local persistent storage device (LPSD) comprising a non-volatile data storage medium; and
    a local data image manager (LDIM) that emulates the local persistent storage device, wherein
        the LDIM is coupled between the processing unit and the LPSD,
        the LDIM comprises a network interface that enables the LDIM to send messages to and receive messages from a remote data image manager (RDIM) that is located remotely from the computer and that can access a remote persistent storage device (RPSD),
        the processing unit is operable to request that data be stored in a non-volatile storage medium,
        the LDIM is configured to receive the data from the processing unit, and
        the LDIM is operable to (a) issue a write request and transmit the data to the LPSD so that the LPSD will store the data on the non-volatile storage medium and (b) transmit the data to the RDIM using the network interface after receiving the data from the processing unit.

2. The computer of claim 1, wherein the LDIM transmits the data to the RDIM substantially concurrently with writing the data to the LPSD.

3. The computer of claim 1, wherein the LDIM is further operable to store the data or a pointer to the data if the LDIM cannot successfully transmit the data to the RDIM, thereby enabling the LDIM to send the data to the RDIM at a later time when the LDIM can successfully transmit the data to the RDIM.

4. The computer of claim 1, wherein the LPSD is a hard disk drive, the computer further comprises a disk adapter, and the LDIM is coupled to the processing unit through the disk adapter.

5. The computer of claim 4, wherein the LDIM comprises a connector and the LPSD is coupled to the LDIM through the LDIP's connector.

6. The computer of claim 4, wherein the LDIM receives the data directly from the disk adapter and transmits the data to the LPSD through the LDIM connector to which the LPSD is connected.

7. The computer of claim 1, wherein the LDIM is coupled to the processing unit through a standard persistent storage device interface.

8. The computer of claim 1, wherein the standard persistent storage device interface is one of the ATA interface, SCSI interface, ST-506/412 interface, ESDI interface, IDE interface, ATAPI interface, ATA-E and EIDE interface.

9. The computer of claim 1, wherein, when the processing unit issues a non-data request, the non-data request is received by the LDIM and, in response to receiving the non-data request, the LDIM returns a response to the processing unit.

10. The computer of claim 1, further comprising a motherboard, wherein the processing unit is installed on the motherboard and the LDIM is connected to the motherboard by a cable.

11. In a computer having an operating system that receives from an application a request to store data on a local persistent storage device (LPSD) and that is configured to send the request and the data to a device driver for the LPSD, with the device driver being operable to issue the request and the data to a disk adapter or to a basic input/output system (BIOS), a method comprising the steps of:
    receiving the request and the data directly from the device driver; and
    in response to receiving the request and the data from the device driver, performing the steps of:
        issuing a write request to the LPSD; and
        transmitting a write request message to a system located remotely from the computer, wherein the write request message includes the data and an indication that the data should be written to a data storage medium.

12. The method of claim 11, wherein the request issued from the device driver includes a first address and the message transmitted to the system located remotely from the computer includes a second address, wherein the second address is a function of the first address.

13. The method of claim 12, wherein the second address is the same as the first address.

14. The method of claim 11, wherein the steps of issuing the write request to the LPSD and transmitting the write request message are performed substantially concurrently.

15. The method of claim 11, further comprising the steps of:
    receiving a non-data request directly from the device driver; and
    in response to receiving the non-data request, sending a response directly back to the device driver.

16. In a computer having a device driver, wherein the device driver receives a request to store data on a local persistent storage device (LPSD), and wherein the device driver is configured to issue the request to a disk adapter, and the disk adapter is configured to send the request to a controller of the LPSD, a method comprising the steps of:
    receiving a request directly from the disk adapter, wherein the request requests that data be written; and
    in response to receiving the request, performing the steps of:
        issuing a write request to the LPSD; and
        transmitting a write request message to a system located remotely from the computer, wherein the write request message includes the data and an indication that the data should be written to a data storage medium.

17. The method of claim 16, wherein the request issued from the device driver includes a first address and the message transmitted to the system located remotely from the computer includes a second address, wherein the second address is a function of the first address.

18. The method of claim 17, wherein the second address is the same as the first address.

19. The method of claim 16, wherein the steps of issuing the write request to the LPSD and transmitting the write request message are performed substantially concurrently.

20. The method of claim 16, further comprising the steps of:
receiving a non-data request directly from the device driver; and
in response to receiving the non-data request, sending a response directly back to the disk adapter.

21. In an environment where a device comprises a processor and a local persistent storage device (LPSD), a method for managing the LPSD's data image, comprising the steps of:
copying at least a portion of the data image;
storing the copied portion of the data image on a remote persistent storage device (RPSD) located remotely from the device;
receiving a request to write data to the LPSD, wherein the request was transmitted by the processor; and
in response to receiving the request, performing the steps of:
issuing a write request to the LPSD; and
transmitting a write request message to a system located remotely from the computer, wherein the message includes the data and wherein the system is operable to write the data the RPSD.

22. The system of claim 21, wherein the LPSD is a hard disk drive that comprises a hard disk.

23. The method of claim 21, further comprising the steps of:
receiving a non-data request transmitted from the processor; and
in response to receiving the non-data request, sending a response back to the processor.

24. The method of claim 21, wherein the steps of issuing the write request to the LPSD and transmitting the write request message are performed substantially concurrently.

25. A local data image manager, comprising:
interface means for interfacing to a persistent storage device (PSD);
receiving means for receiving commands and data, wherein the commands comprise read commands, write commands, and non-data commands;
means for issuing a write command to the PSD after the receiving means receives data and a write command; and
means for transmitting a write request message to a remote system located remotely from the local data image manager after the receiving means receives data and a write command.

26. The local data image manager of claim 25, wherein said means for receiving said commands receives said commands from a disk adapter.

27. The local data image manager of claim 25, wherein said PSD is a hard disk drive that comprises a hard disk.

28. The local data image manager of claim 27, wherein the receiving means comprises interface means for interfacing with a disk adapter.

29. The local data image manager of claim 28, wherein the interface means comprises a 40 pin IDE flat cable connector.

30. A system, comprising:
a first circuit board; first processing means disposed on the first circuit board;
a first local persistent storage device (LPSD) connector operable to connect to an LPSD, the LPSD connector being disposed on the first circuit board;
a second circuit board;
second processing means disposed on the second circuit board, the second processing means being programmed to emulate an LPSD;
a connector, disposed on the second circuit board, being connected to the LPSD connector disposed on the first circuit board;
transmitting means disposed on the second circuit board for enabling the second processing means to send messages to and receive messages from a remote system that is located remotely from the system and that can access a remote persistent storage device (RPSD), and
a second LPSD connector, the second LPSD connector being disposed on said second circuit board.

31. The system of claim 30, further comprising an LPSD, wherein the LPSD is connected to the second LPSD connector.

32. The system of claim 31, wherein the LPSD connected to the second LPSD connector is a hard disk drive.

33. The system of claim 31, wherein the LPSD connected to the second LPSD connector is a drive for writing data to compact disc.

34. The system of claim 33, wherein the second processing means receives read, write, and non-data commands issued from the first processing unit.

35. The system of claim 34, wherein the second processing means issues a write command to the LPSD connected to the second LPSD connector in response to receiving a write command issued from the first processing unit and also transmits a write request message to the remote system in response to receiving the write command.

36. The system of claim 35, wherein the second processing means issues the write command to the LPSD and transmits the write request message substantially concurrently.

37. In a system having an local data image manager (LDIM) and a local persistent storage device (LPSD) connected to the LDIM, a method, comprising:
receiving, at the LDIM, data, a request to store the data, and a first value for identifying a segment of a data storage medium; and
in response to receiving the data, the request to store the data, and the value, performing the steps of:
sending to the LPSD from the LDIM, the data, a second value for identifying a segment of a data storage medium, and a request to store the data; and
transmitting, via a network, a message to a remote system, wherein the message includes the data and a request for the remote system to store the data.

38. The method of claim 37, wherein the first value is a sector value for identifying a sector.

39. The method of claim 37, wherein the LPSD is a hard disk drive.

40. The method of claim 37, wherein the sending and transmitting steps are performed substantially concurrently.

41. The method of claim 37, further wherein the second value is not equal to the first value.

42. The method of claim 41, further comprising the step of determining the second value based on the first value.

43. The method of claim 37, wherein the LPSD comprises one of a hard disk, a read/write CD, a ZIP disk, a JAZ disk, and a floppy disk.

44. The method of claim 37, wherein the data included in the message transmitted to the remote system is encrypted data.

* * * * *